United States Patent

[11] 3,596,932

[72] Inventor Lewis R. Kinsey
  108 South 25th St., Phoenix, Ariz. 85034
[21] Appl. No. 12,250
[22] Filed. Feb. 18, 1970
[45] Patented Aug. 3, 1971

[54] QUICK COUPLE UNION
  4 Claims, 4 Drawing Figs.
[52] U.S. Cl. .................................................. 285/81,
  285/111, 285/369
[51] Int. Cl. ............................................. F16l 35/00
[50] Field of Search ........................................... 285/81,
  369, 354, 372, 348, 414, DIG. 7, 111

[56] References Cited
UNITED STATES PATENTS
442,947   12/1890   Bowers ......................... 285/414 X

| 781,157   | 1/1905  | Powell .......................... | 285/DIG. 7 |
| 1,681,444 | 8/1928  | Stevens ........................ | 285/81 X   |
| 1,782,484 | 11/1930 | Spencer et al. ................ | 285/DIG. 7 |
| 2,366,010 | 12/1944 | Dies ............................ | 285/414    |
| 2,535,694 | 12/1950 | Payne .......................... | 285/DIG. 7 |
| 2,900,200 | 8/1959  | Umstadter .................... | 285/369 X  |

Primary Examiner—Dave W. Arola
Attorney—Willard L. Groene

ABSTRACT: A quick connect and disconnect pipe union characterized by a new type of water gasket and sealer arranged so the pressure of the water holds down the sealing gasket and by the use of special snap rings to lock the union elements demountably together.

Patented Aug. 3, 1971 3,596,932
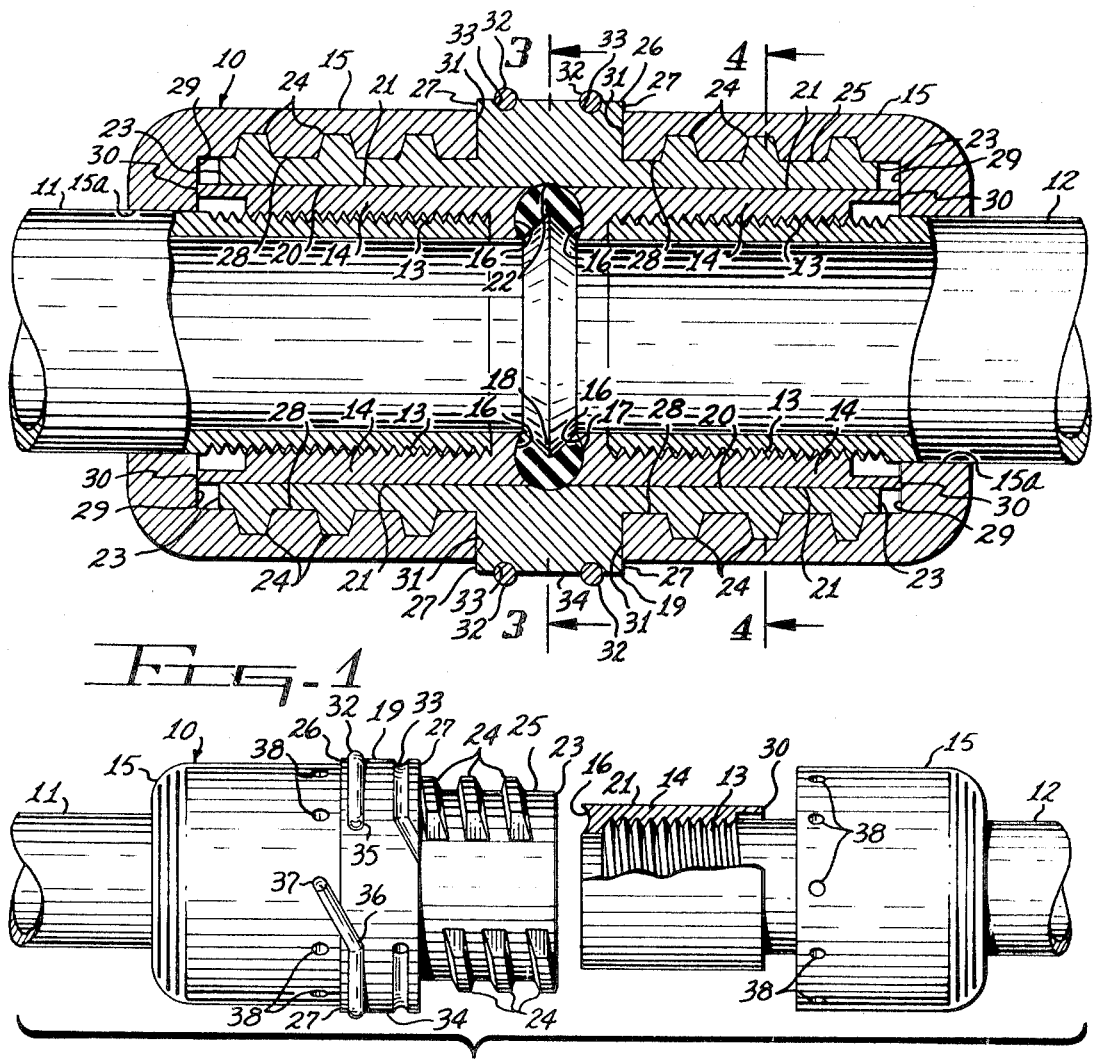
Fig-1
Fig-2
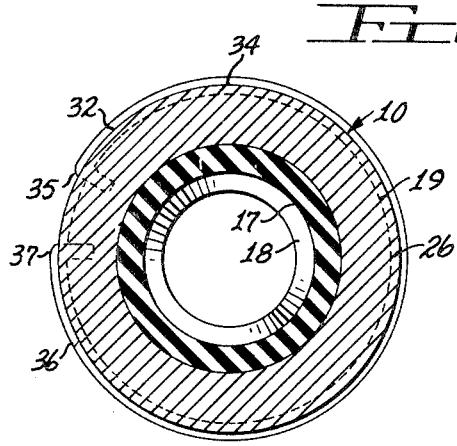
Fig-3
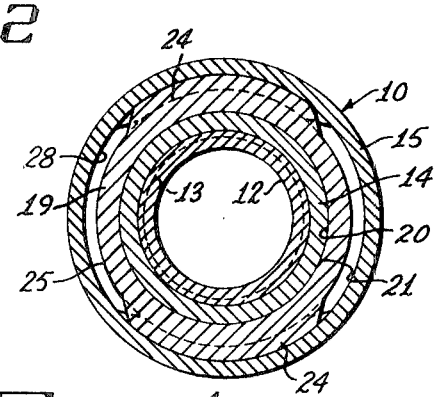
Fig-4
INVENTOR.
LEWIS R. KINSEY
BY Willard S. Greene
ATTORNEY

QUICK COUPLE UNION

BACKGROUND OF THE INVENTION

This invention pertains to pipe fittings for joining sections of pipe together, and is particularly directed to quick couple and disconnect unions for such use.

Heretofore, it has been a slow and tedious process in plumbing a building, fitting by fitting, And it has been difficult to take apart sections of the piping quickly and easily to make changes and repairs. Former unions were subject to leakage and difficult to take apart, especially in confined locations, Also, former devices were highly complicated, difficult to manufacture, and hard to assemble and fit to existing pipe lines.

SUMMARY OF THE INVENTION

One of the object of this invention is to provide a quick couple union which helps speed up the installation of the plumbing system when building a house or any other place where plumbing systems are to be installed.

Another object of this invention is to provide a quick couple union so that a complete plumbing system can be designed and set up before the building is set up, this being done by dividing the length and width of the system with these specially constructed unions into the proper length for handling and when so used they are simply and quickly connected with a one-quarter turn by hand and no tools.

And still another object is to provide a quick couple union purely hand operated for use in those temporary jobs where the plumbing will soon be removed, the union making it so simple that in many cases the average layman can handle the job.

BRIEF DESCRIPTION OF THE DRAWINGS

FIG. 1, is an enlarged sectional view showing a quick couple union incorporating the features of this invention.

FIG. 2, is an exploded view of the device shown in FIG. 1.

FIG. 3, is a cross-sectional view on the line 3–3 of FIG. 1.

FIG. 4, is a cross-sectional view on the line 4–4 of FIG. 1.

DESCRIPTION OF THE PREFERRED EMBODIMENT

As an example of one embodiment of this invention, there is shown a quick couple union 10 for joining together two pieces of pipe 11 and 12 having conventional pipe threads 13 on which are mounted the sealing sleeves 14 after the clamping nuts 15 have their bores 15a slipped over the ends of the pipes 11 and 12.

The inner ends of the sealing sleeves 14 are formed with arcuate annular grooves 16 between which is carried an O-ring seal 17. The O-ring seal has a cutaway groove 18, equal to about 25 percent of the cross-sectional area of the O-ring.

An alignment bushing 19 has a bore 20 arranged to slide over the peripheral diameters 21 of the sealing sleeves 14 to initially align the pipes 11 and 12. An arcuate annular groove 22 is formed in the bore 20 intermediate the ends 23 of the bushing 19 so as to receive the outer periphery of the O-ring 17.

Camlock threads 24 are formed in diametrically opposed quadrants on the outer end peripheries 25 of the bushing 19 each side of its central flange 26 having radially disposed side faces 27. The clamping nuts 15 having threaded bores 28 matingly engage the camlock threads 24 of the bushing 19. When the nuts 15 are tightened, their bottom radial surfaces 29 engage the rearward ends 30 of the sleeves 14 axially toward each other to engage and secure the O-ring between their arcuate annular grooves 16 with proper sealing pressure, the seal 17 being expanded to properly engage the arcuate annular groove in the bushing 19. Further axial movement of the sleeves 14 is arrested by engagement of the inner radial faces 31 of the nuts 15 with the radially disposed side faces of the flange 26 of the bushing 19 to thus provide the further proper sealing pressure of the surfaces 16 and 22 with the O-ring 17.

The thusly applied nuts 15 may be secured by snap rings 32 each of which lie in a groove 33 on the periphery 34 of the flange 26 having on the end 35 turned radially inwardly into a hole in the flange and the other end angling off at 36 with a radially inwardly turned end 37 arranged to be snapped into locking holes 38 formed in the periphery 39 of the nuts 15.

The cutaway groove 18 in the O-ring seal 17 is exposed to the fluid pressure in the pipeline 11, 12 so that the seal is pressed more tightly against the arcuate surfaces 16 and 22 of the sleeves 14 and the alignment bushing 19 with increased pressure so as to maintain a tight seal under all operating conditions for the coupling.

I claim:

1. A quick coupling union adapted to interconnect the threaded ends of a pair of pipes comprising:
   A. a pair of sealing sleeves arranged to be threadedly mounted on the threaded ends of the pipes,
   B. clamping nuts having radially inwardly directed shoulders positioned behind said sealing sleeves with an inner diameter less than the outer diameter of said sealing,
   C. An alignment bushing having a bore arranged to slip over the peripheral outside diameter of both of the sealing sleeves to bring the sealing sleeves and the pipes arranged to be threadedly mounted therein into aligned condition,
   D. a centrally located radially outwardly extending flange having radially disposed side faces formed on the outer periphery of the alignment bushing,
   E. threads formed on the outer end peripheries of the alignment bushing on each side of its central flange,
   F. threaded bores formed in the clamping nuts matingly engaging the threads of the alignment bushing,
   G. radially disposed surfaces on said shoulders in the nuts arranged to engage the outer axial ends of the sealing sleeves when the clamping nuts are tightened to move toward each other,
   H. radial faces on the inner axial ends of the nuts to limit axial movement of the clamping nuts toward each other by engagement with the radially disposed side faces of the flange of the alignment sleeve,
   I. and an O-ring seal supported in the bore of the alignment bushing and confined between and sealing engaging the axial inner facing ends of the sealing sleeves when the clamping nuts are tightened against the flange radial side faces of the alignment sleeve.

2. A Quick couple union as in claim 1 wherein annular arcuate grooves are formed in the axial inner ends of the sealing sleeves and the bore of the alignment bushing to contact the O-ring in sealed relationship when the union is clamped up.

3. A Quick couple union as in claim 1 wherein snap ring securing devices are provided with ends secured to the flange of the alignment bushing and the clamping nuts to lock the nuts in clamped up position.

4. A Quick couple union as in claim 1 wherein camlock threads are formed in diametrically opposed quadrants on the outer peripheries of the alignment bushing and the clamping nuts have mating camlock threads rapidly engageable and disengageable with the camlock threads of the alignment bushing.